United States Patent
Wu (10) Patent No.: US 8,811,411 B2
(45) Date of Patent: Aug. 19, 2014

(54) PACKET AGGREGATION AND FRAGMENTATION AT LAYER-2 OVER A MANAGED NETWORK

(75) Inventor: Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 0 days.

(21) Appl. No.: 12/343,941

(22) Filed: Dec. 24, 2008

(65) Prior Publication Data

US 2010/0158015 A1    Jun. 24, 2010

(51) Int. Cl.
*H04L 12/28* (2006.01)

(52) U.S. Cl.
USPC ............ 370/395.7; 370/395.1; 370/412; 370/418

(58) Field of Classification Search
USPC ............ 370/329, 335, 342, 395, 450, 46; 386/95, 125; 710/22, 105, 106
See application file for complete search history.

(56) References Cited

U.S. PATENT DOCUMENTS

| | | | |
|---|---|---|---|
| 6,397,356 B1 * | 5/2002 | Yonezawa | 714/43 |
| 6,956,818 B1 | 10/2005 | Thodiyil | |
| 7,111,092 B1 * | 9/2006 | Mitten et al. | 710/52 |
| 2001/0016112 A1 * | 8/2001 | Heo et al. | 386/95 |
| 2003/0200315 A1 * | 10/2003 | Goldenberg et al. | 709/225 |
| 2004/0057380 A1 * | 3/2004 | Biran et al. | 370/235 |
| 2005/0021827 A1 * | 1/2005 | Matsuura | 709/232 |
| 2006/0067348 A1 * | 3/2006 | Jain et al. | 370/412 |
| 2007/0120058 A1 * | 5/2007 | Blackwell et al. | 250/338.1 |
| 2008/0117919 A1 * | 5/2008 | Kliger et al. | 370/400 |
| 2008/0120675 A1 * | 5/2008 | Morad et al. | 725/120 |
| 2010/0061324 A1 * | 3/2010 | Liao et al. | 370/329 |

FOREIGN PATENT DOCUMENTS

JP   2001016258 A2   1/2001
JP   2006311464 A2   11/2006

* cited by examiner

*Primary Examiner* — Anez Ebrahim
(74) *Attorney, Agent, or Firm* — Richard Bachand; Bruce Greenhaus; Sheppard Mullin Richter & Hampton LLP (57) ABSTRACT

A method and apparatus for receiving packets from a node within a first network in accordance with a first protocol. A descriptor associated with each received packet is read by a direct memory access (DMA) controller that stores the received packet. A value for a controllable parameter is selected to efficiently communicate the content of the received packet over a second network that operates in accordance with a second protocol. The information in the received packet is then organized into newly formed packets, the size of which makes them efficient for communication over the network in the second protocol. The newly formed packets are stored in a transmit line buffer and associated with a Protocol Descriptor. The Protocol Descriptor provides information to a transmit controller to allow the transmit controller to select and aggregate packets from the transmit line buffer in order to make efficient use of the second protocol.

20 Claims, 5 Drawing Sheets

PACKET AGGREGATION AND FRAGMENTATION AT LAYER-2 OVER A MANAGED NETWORK

TECHNICAL FIELD

The disclosed method and apparatus relates to network communications, and more specifically, some embodiments relate to efficient communication of packets in a home entertainment network.

BACKGROUND

It is becoming more desirable for home entertainment components to communication with one another over a home entertainment network. Such communications allow entertainment content, such as movies, music, internet content, etc. as well as telephone service, to be handled by a network of devices rather than being isolated to one particular home entertainment device.

One particular standard that has been adopted to establish a home entertainment network within a home is the industry standard established by MoCA (Multi-media over Coaxial Alliance). The MoCA standard allows components (sometimes referred to as "nodes") to communicate with one another and to share content over a high-speed network using coaxial cable as the media that connects the nodes. The network is established with one node being selected to perform the functions of a "Network Controller" (NC). The NC functions include organizing and arbitrating the communications over a single coaxial cable that links all of the nodes of the network. Since the media (i.e., the coaxial cable) is shared, the MoCA standard establishes an arbitration scheme by which the NC determines which node will have control of the media at any particular moment in time.

In accordance with this scheme, the NC will schedule all communications over the media. This schedule is communicated to each of the nodes of the network in what is referred to as a Media Access Plan (MAP). MAPs are sent by the NC on a regularly scheduled basis. Each MAP is placed at the beginning of a MAP cycle. The MAP indicates which node will be transmitting at each time interval in the following MAP cycle.

Figure 1:
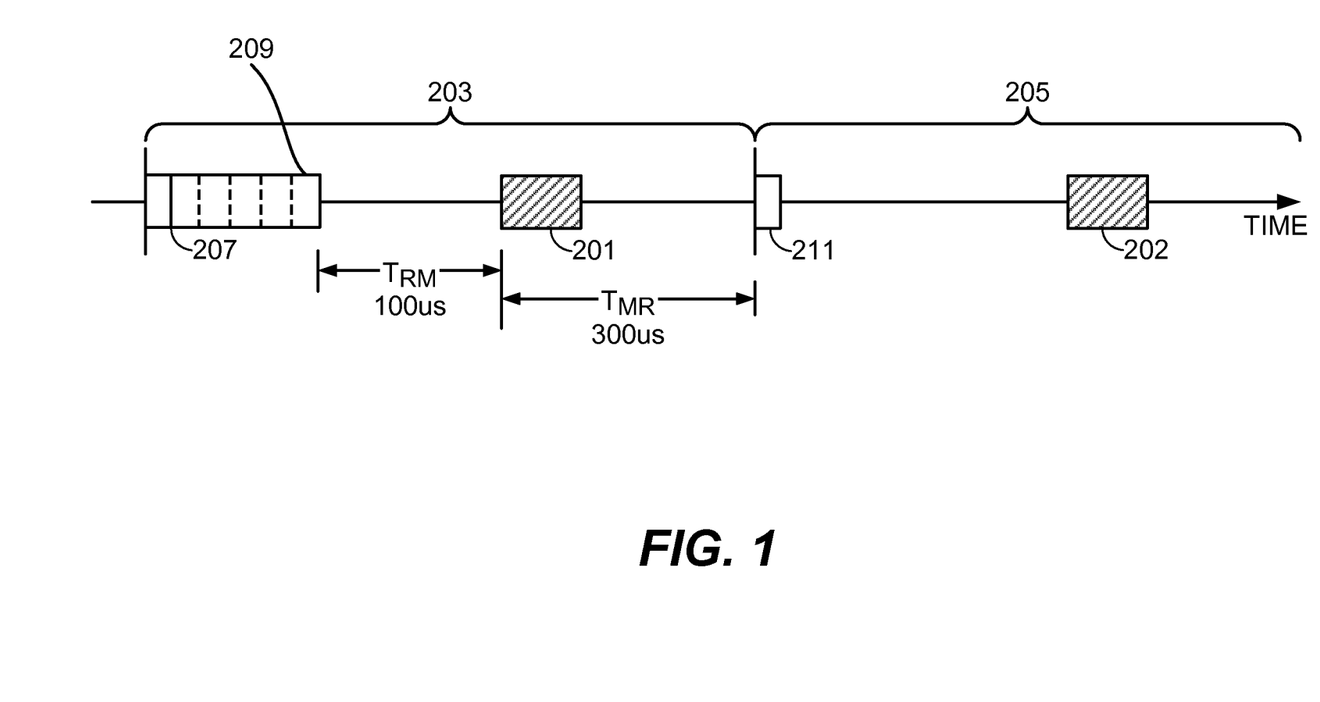
FIG. 1 is a timing diagram that illustrates the timing relationship between Maps and Map cycles.

FIG. 1 is a timing diagram that illustrates the timing relationship between Maps 201, 202 and Map cycles 203, 205. A MAP cycle 205 is defined as the communication activity on the channel under the control of the previously sent MAP 201. Accordingly, each MAP 201 schedules all of the communication activity for the next MAP cycle 205 (only one such "next MAP cycle" 205 is shown in FIG. 1). It should be noted that the next MAP 202 is sent during the next MAP cycle 205 under the scheduling control of the previous MAP 201. Accordingly, the MAP 201 determines the following information for each packet to be sent in the next MAP cycle 205: i) packet start time; ii) packet length; iii) source node; and iv) destination node(s).

One particular type of packet that the MAP 201, 202 is responsible for scheduling is a reservation request (RR) 207, 209, 211. Six such RRs are shown in the first MAP cycle 203 of FIG. 1, starting with the first RR 207 and ending with the last RR 209. One RR 211 is shown in the second MAP cycle 205. RRs 207, 209, 211 are sent by client nodes to indicate that the client node has packets that it wishes to send and thus to request that the NC schedule a time during a subsequent MAP cycle when the client node can send those packets. Accordingly, when a client node has information to transmit, the client node must first wait for the NC to allocate a time when the client node can send an RR 207, 209, 211. Once the NC has allocated a time during which the client node can send an RR 207, 209, 211, the client node communicates the RR 207, 209, 211 to the NC at the time allocated (e.g., at the packet start time and for the packet length indicated by the MAP 201 for RR 211).

The RR 207, 209 allows the client node to communicate to the NC that the client node has data packets it wishes to send. Furthermore, the RR 207, 209 indicates the associated destination node(s), packet length, packet priority and so on for those data packets. Packets with higher priority will be scheduled ahead of packets with lower priority. The NC uses this information to schedule times during which the client node can transmit those data packets it wishes to send. The NC then communicates that schedule by generating and transmitting the MAP 201 for the next MAP cycle 205.

Once an RR from a client node has been granted, the client node will transmit the data packets to be communicated during the time allocated by the NC. The data packets have a particular format that dictates the maximum length of a data packet, and the content of the header of the data packet and any other overhead information, such as forward error correction codes. The longer the data packet, the more efficiently the media will be used. That is, the more data that is loaded into a data packet, the greater the ratio of data to overhead. The greater the ratio of data to overhead the more data can be communicated over the media in a given amount of time (i.e., greater media efficiency), assuming that the amount of time over which the efficiency is measured is relatively long with respect to the packet length.

However, the data that a particular client node has to send may come from different source applications, have different packet sizes, have different destinations and have different priorities assigned. Accordingly, sorting the different packets that come in from different source applications can be cumbersome and add to the inefficiency of the network generally. Therefore, there is a need for an efficient and relatively simple way to allocate information from different source applications to packets that are to be transmitted over a network, such as a MoCA network, which has a defined packet overhead and maximum packet size.

SUMMARY OF DISCLOSED METHOD AND APPARATUS

This document discloses a method and apparatus for receiving packets from a node within a first network, wherein the received packets are organized in accordance with a first protocol. A descriptor associated with each received packet includes information about the received packet that is read by a direct memory access (DMA) controller that stores the received packet.

A value for a controllable parameter is selected. The controllable parameter determines the size of packets to be efficiently communicated over a second network that operates in accordance with a second protocol. The parameter can be selected by an application using an automated process or manually. In either case, the parameter is preferably selected based upon the size of the received packet and the type of information being communicated in the received packet. The information in the received packet is then organized into newly formed packets, the size of which makes them efficient for communication over the network in the second protocol. Depending upon the value of the controllable parameter, the size of the newly formed packets may be identical to the size of the received packets or larger than the received packets.

The newly formed packets are stored in a transmit line buffer and all of the newly formed packets that were initially in the same service packet are associated with a Protocol Descriptor. The Protocol Descriptor provides information to a transmit controller to allow the transmit controller to select and aggregate packets from the transmit line buffer in order to make efficient use of the second protocol.

BRIEF DESCRIPTION OF THE DRAWINGS

The disclosed method and apparatus, in accordance with one or more various embodiments, is described with reference to the following figures.

The drawings are provided for purposes of illustration only and merely depict examples of some embodiments of the disclosed method and apparatus. They should not be considered to limit the breadth, scope, or applicability of the claimed invention. It should be noted that for clarity and ease of illustration these drawings are not necessarily made to scale.

DETAILED DESCRIPTION

A method and apparatus for controlling communication within a network is disclosed herein. The following description refers primarily to a home entertainment network based upon the MoCA standard. However, it will be well understood by those skilled in the art that the disclosed method and apparatus may well be used in any communications network in which it is desirable to use the media efficiently.

Figure 2:
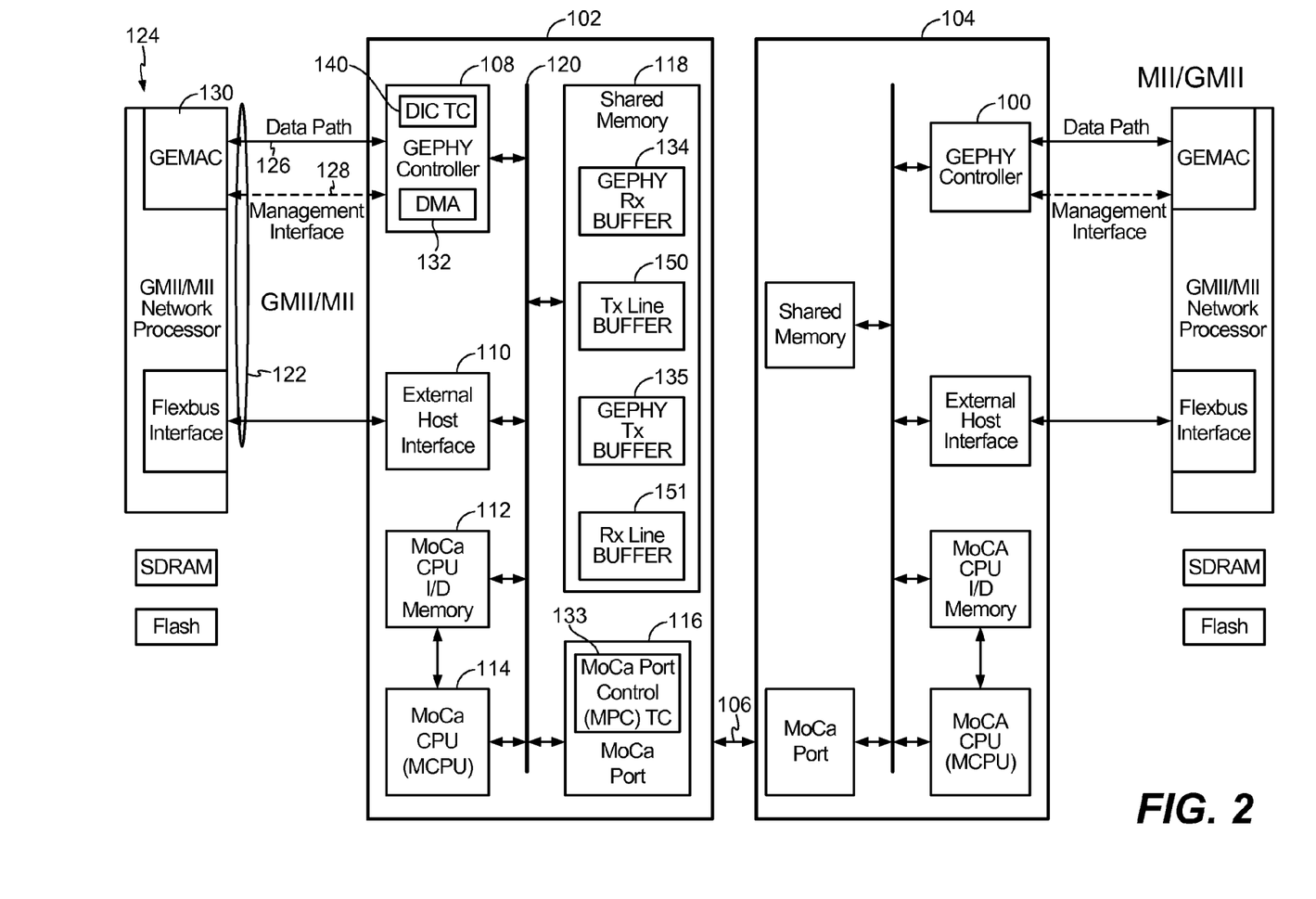
FIG. 2 is a block diagram of a system that includes the disclosed method and apparatus.

FIG. 2 is a block diagram of a system that includes the disclosed method and apparatus. A first node 102 and second node 104 of a MoCA network are connected by a coaxial cable 106 (the "media"). Each node 102, 104 is essentially identical. Accordingly, only one node 102 will be described in detail here. In accordance with one embodiment of the disclosed method and apparatus, the node 102 includes a physical layer controller, such as a Gigabyte Ethernet Physical layer Controller (GEPHY) 108, which executes instructions from a memory. In one embodiment, the GEPHY includes support for 1 Gigibyte/second (Gb/s), 100 Megabyte/s (Mb/s), 10 Mb/s, and other speeds. The node 102 also includes an External Host Interface 110. The node 102 further includes: a network central processing unit Instruction/Data memory, such as a MoCA Central Processing Unit Instruction/Data Memory 112 (MoCA CPU I/D Memory); a network CPU, such as a MoCA CPU 114; a network port, such as a MoCA Port 116, and a shared Memory 118. Each of these components is coupled together by a System Bus 120.

Figure 3:
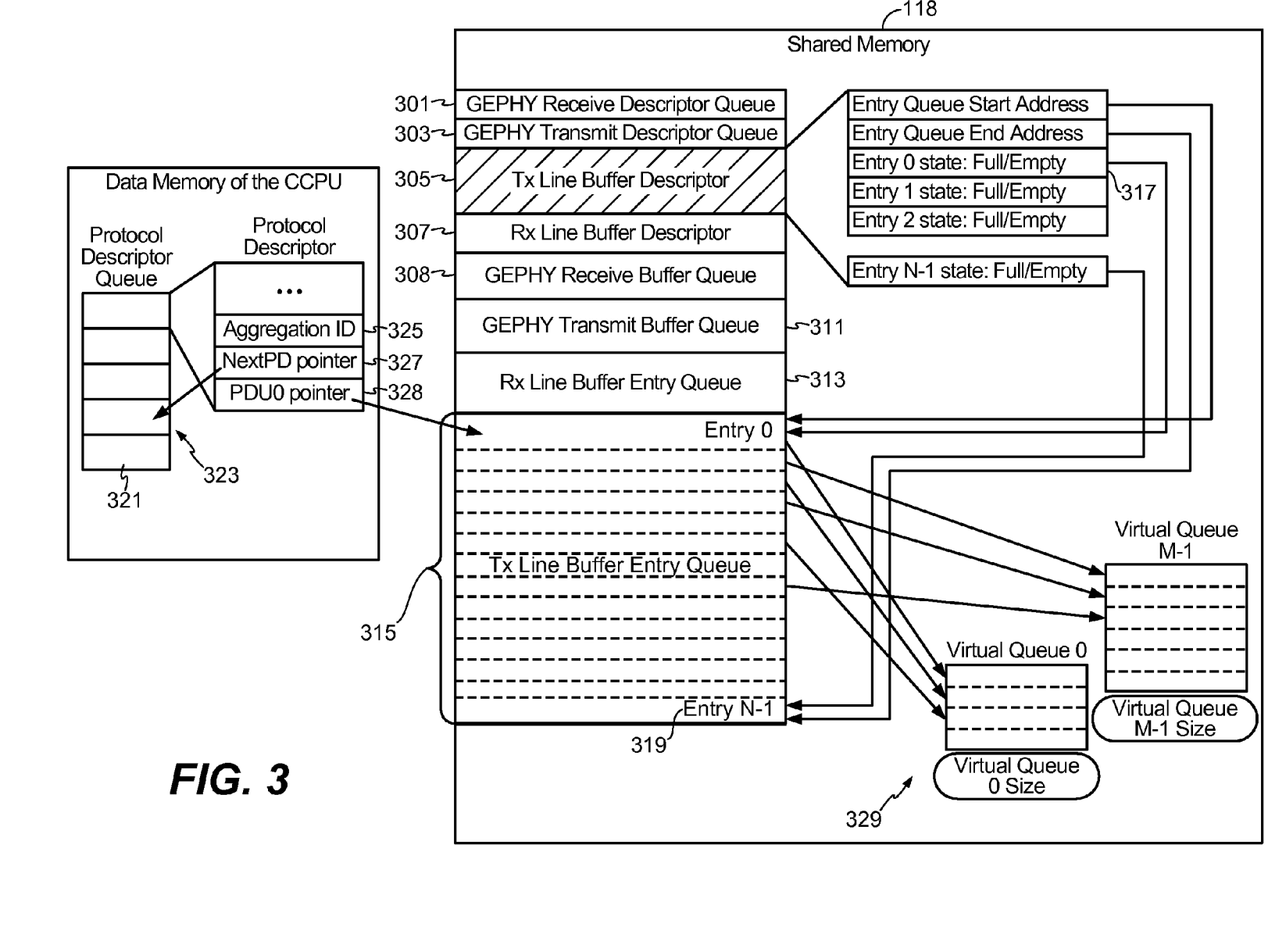
FIG. 3 is an illustration of eight areas of a shared memory used in the disclosed method and apparatus.

As shown in FIG. 2, the shared memory is divided into four buffers; (1) GEPHY Receive Buffer 134, (2) GEPHY Transmit Buffer 135, (3) Transmit Line Buffer 150, and (4) Receive Line Buffer 151. Each buffer 134, 135, 150, 151 is further divided into two parts: (1) a Descriptor Queue and (2) a Data Buffer Queue. FIG. 3 is an illustration of all eight areas of the shared memory 118 (i.e., each of the Descriptors and Queues in each of the four buffers). It should be noted that the Descriptor Queue and Data Buffer Queue associated with the same buffer are not shown to be contiguous in the shared memory 118. In fact, while each of the eight areas is shown in FIG. 3 as a block, in one embodiment of the disclosed method and apparatus, the entries of each Descriptor Queue and Data Buffer Queue are not stored contiguously. Rather, the entries are scattered throughout the shared memory 118 and linked to one another. The eight areas of the shared memory 118 include:

(1) a GEPHY Receive Descriptor Queue 301;
(2) a GEPHY Transmit Descriptor Queue 303;
(3) a Transmit Line Buffer Descriptor 305;
(4) a Receive Line Buffer Descriptor 307;
(5) GEPHY Receive Buffer Queue 309;
(6) GEPHY Transmit Buffer Queue 311;
(7) Receive Line Buffer Entry Queue 313;
(8) Transmit Line Buffer Entry Queue 315.

It will be understood by those skilled in the art that the shared memory can be organized in many different ways to accomplish the goals of the disclosed method and apparatus. In accordance with one embodiment of the disclosed method and apparatus, the information stored within each Data Buffer Queue and Descriptor Queue in the shared memory can be placed in any location in the shared memory, and pointers can be used to address the information. However, one particular configuration is presented herein in order to assist in conveying an understanding of the description of the disclosed method and apparatus.

A brief overview of the operation of the node 102 will provide a foundation for further explanations of the detailed functions of each component of the node 102. As noted above, the node 102 is coupled to another node 104 over the media 106. In addition, the node 102 is coupled to an external network, such as an Ethernet network, over an external network interface, such as a GMII/MII interface 122. Service Packets are communicated from an external network processor 124 to the GEPHY Controller 108 within the node 102. In the case in which the external network is an Ethernet network, the Service Packets are Ethernet packets and the external network processor 124 is a network processor with GMII/MII interface. The Service Packets are communicated over a data path 126 with control information communicated through a management interface 128.

When the Service Packets are received from the source applications via the network processor 124, they are initially stored within a GEPHY Receive Buffer Queue 309 within the shared memory 118. The Service Packets are then moved to the Transmit Line Buffer Entry Queue (TLBEQ) 315. The TLBEQ is defined by the Transmit Line Buffer Descriptor 305. In one embodiment, the TLBEQ 315 is also in the shared memory 118. By moving the Service Packets to the TLBEQ 315, the Service Packets can be divided into packets of a predetermined size called Packet Data Units (PDUs). In one embodiment, PDUs are all the same size. The size of the PDUs is selectively fixed. "Selectively fixed" for the purpose of this description means that the size of the PDUs can be selected for the particular application in which the node is engaged and remains fixed for that application. Having PDUs of uniform size that can be selected to suit the application in which the node is engaged optimizes the efficiency of the shared memory and makes transmission of the packets over the network between the nodes 102, 104 more efficient, as will become clearer from the details provided below.

When the Service Packet is the same size as the PDU size (or smaller), an entire Service Packet will be stored as one PDU in one entry 319 of the TLBEQ 315. Alternatively, when the size of the Service Packet is greater than one PDU, the Service Packet is divided into multiple PDUs, each PDU being stored in one entry 319 in the TLBEQ 315. The process of dividing the Service Packet for storage in more than one PDU is referred to as fragmentation.

Each Service Packet is associated with one Protocol Descriptor (PD). Accordingly, if the Service Packet has been divided into multiple PDUs, there is one PD for all of the PDUs divided from the one Service Packet. Details regarding how the Service Packets are divided and stored in the TLBEQ 315 will be provided below.

PDUs that have common characteristics, such as the priority of the PDU and the destination node to which the PDU is to be sent, are then aggregated into a Transmit Packet and sent over the MoCA network. Properly selecting the size of the PDUs for each application with which the node is engaged will allow PDUs to be efficiently aggregated. Aggregating the PDUs increases the size of the payload in each of the packets transmitted between the nodes of the network. Larger payloads means an increase in the efficiency of the Media Access Control (MAC) layer of the network between the nodes 102, 104. The MAC efficiency typically increases because the size of the header (the information other than the payload) will be essentially fixed regardless of the size of the payload of the MAC packet. Accordingly, it is advantageous to maximize the MAC layer efficiency by using a relatively large Transmit Packet size. In the embodiment of the disclosed method and apparatus in which a MoCA network is used for communication between the transmitting node 102 and the receiving node 104, the Transmit Packet is a MoCA Packet. In one embodiment in which the nodes 102, 104 communicate over a MoCA network, each node that is capable of receiving aggregated packets must communicate that capability to the MoCA Network Coordinator. The Network Coordinator will communicate the capability of each node to each other node. A transmitting node will only transmit aggregated packets to nodes that have reported that they have the capability to receive such aggregated packets.

In one embodiment of the disclosed method and apparatus, when an application uses a fixed Service Packet size, the size of the Service Packet is selected as the size of the PDU. Alternatively, the Service Packet size can be selected to other values. It is advantageous to be able to redefine the PDU size for different applications (i.e., when Service Packets of different lengths need to be handled). Once created, the PDU can then be grouped together in aggregates to form Transmit Packets having a length that is most efficient for transmission over the network between the nodes 102, 104, such as a MoCA network. The details of the dataflow will now be presented.

Basic Dataflow

The following is a description of the basic dataflow from the transmit node 102 to the receive node 104 shown in FIG. 2. The dataflow is described for the case in which the transmit node 102 receives Service Packets from an external source or its application layer. Note that while the node 102 is referred to as the "transmit" node 102, it must first receive Service Packets from an external source or its application layer. In the embodiment that will now be described, the Service Packets that the transmit node 102 receives are Ethernet Packets. In addition, in one embodiment of the disclosed method and apparatus, the network that is used to communicate from the transmit node 102 to the receive node 104 is a MoCA network. However, it will be understood by those skilled in the art that any type Service Packet can be received by the transmit node. Likewise, any network protocol can be used for the communication of information between the transmit node 102 and the receive node 104.

Transmit Path

The external network processor 124 shown in FIG. 2 includes a Gigabyte Ethernet Media Access Control Layer (GEMAC) device 130. The GEMAC 130 sends Service Packets (e.g., Ethernet packets) to the GEPHY Controller 108, through the GMII/MII interface 122. The received Service Packets are temporarily stored in the GEPHY Receive Buffer Queue 309 within the shared memory 118. The GEPHY Received Buffer Queue 309 is defined and controlled by the GEPHY Receive Descriptor Queue 301.

The Service Packets are placed into the GEPHY Receive Buffer Queue 309 by a direct memory access (DMA) controller 132. In one embodiment, the GEPHY Controller 108 includes a Data Interface Control (DIC) Transfer Controller (TC) 140. Prior to receiving any Service Packets, the DIC TC 140 initializes the GEPHY Receive Descriptor Queue 301 by loading at least one Receive Descriptor 136 (see FIG. 4) into the GEPHY Receive Descriptor Queue 301. The direct memory access (DMA) controller 132 reads the Receive Descriptor loaded by the DIC TC 140. The DMA controller 132 uses the information in the Receive Descriptor 136 to control the process of storing Service Packets in the GEPHY Receive Buffer Queue 309.

FIG. 2 shows the DMA controller 132 and the DIC TC 140 residing in the GEPHY Controller 108. However, it will be understood by those skilled in the art that in an alternative embodiment, the DMA controller 132, the DIC TC 140, or both are independent of the GEPHY Controller 108. As is illustrated in FIG. 3, the GEPHY Receive Descriptor Queue 301 and the GEPHY Receive Buffer Queue 309 do not need to be located in contiguous locations within the shared memory 118.

Figure 4:
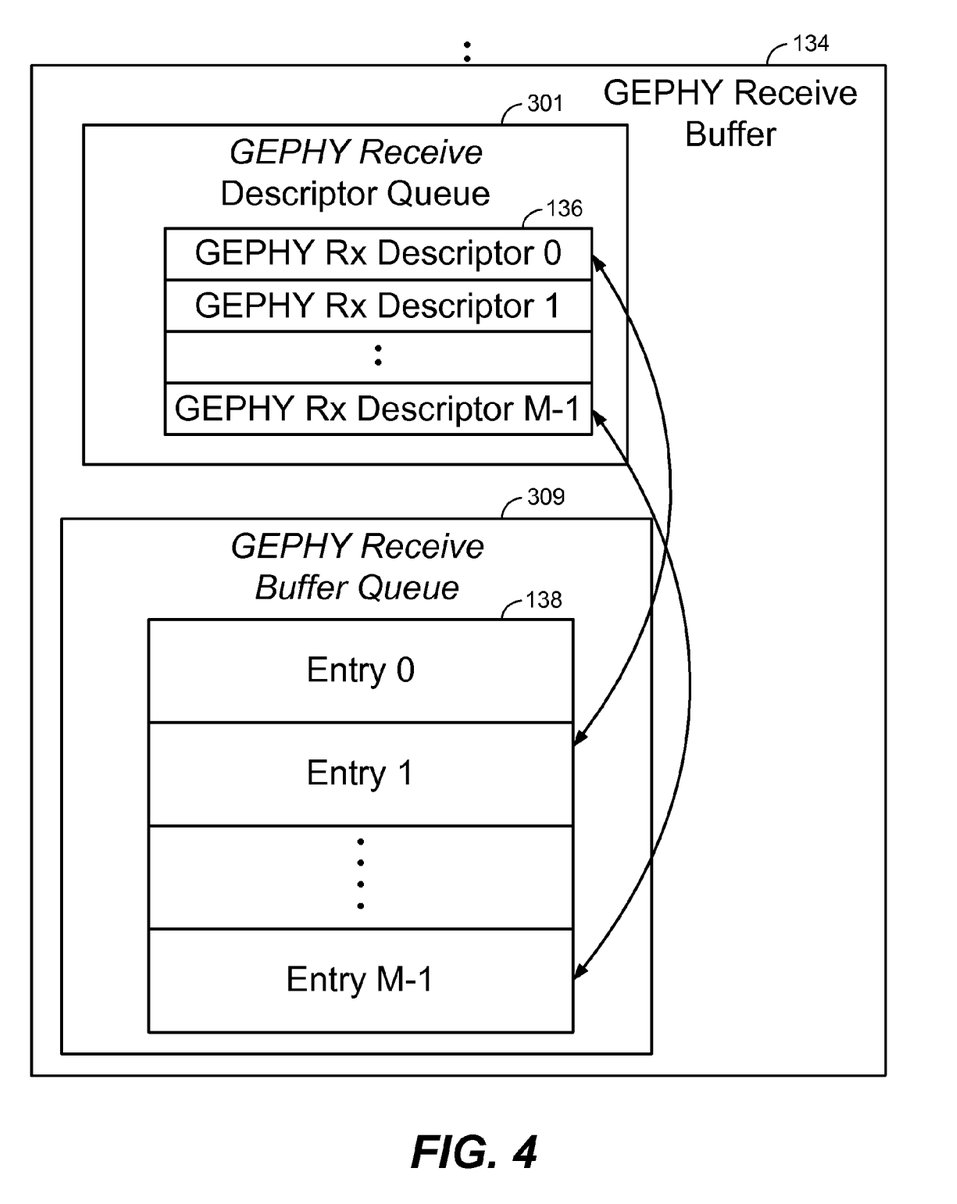
FIG. 4 is an illustration of the relationship between a GEPHY Receive Buffer Queue and a GEPHY Receive Descriptor Queue.

FIG. 4 is an illustration of the relationship between the GEPHY Receive Buffer Queue 309 and the GEPHY Receive Descriptor Queue 301. Each Service Packet 138 is stored in an entry 138 in the GEPHY Receive Buffer Queue 309. The Descriptor Queue 301 includes the set of Receive Descriptors 136 loaded by the DIC TC 140. Each Receive Descriptor 136 is associated with a unique one of the entries 138 in the GEPHY Receive Buffer Queue 309.

Figure 5:
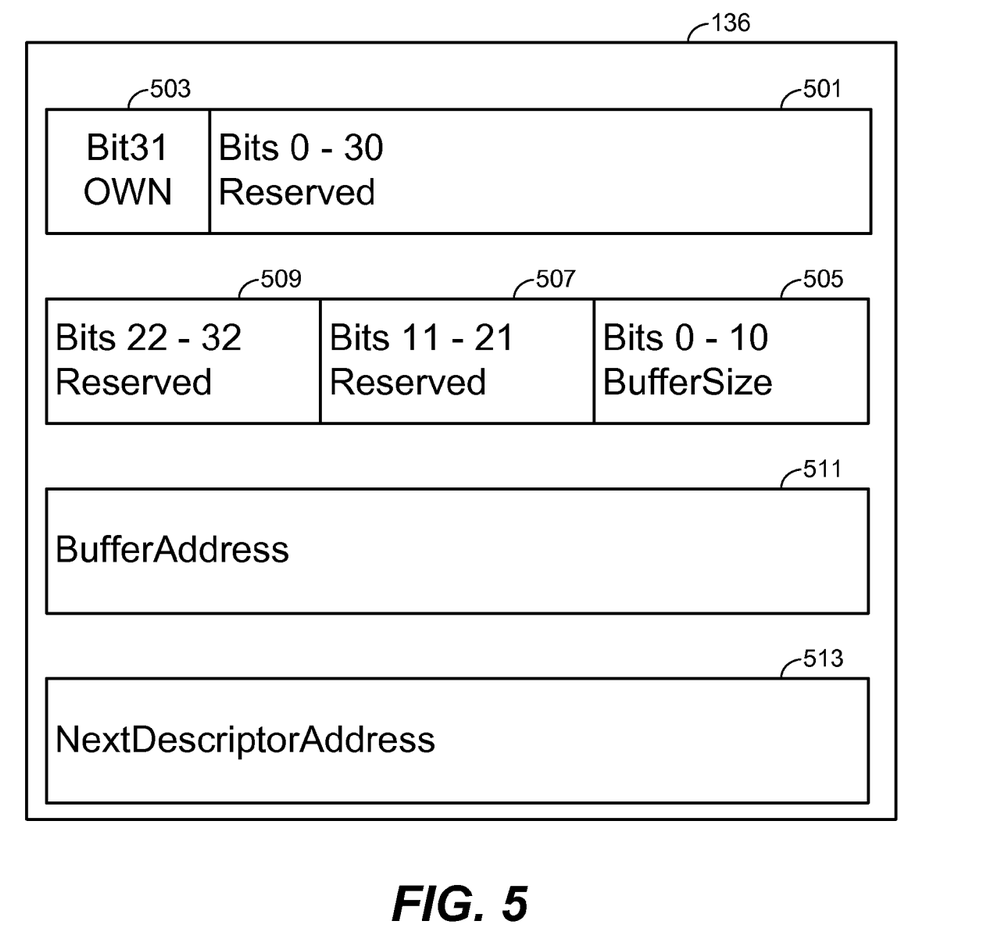
FIG. 5 illustrates the format and content of a Receive Descriptor in accordance with one embodiment of the disclosed method and apparatus.

FIG. 5 illustrates the format and content of the Receive Descriptor 136 in accordance with one embodiment of the disclosed method and apparatus. The Receive Descriptor 136 is defined and configured by the DIC TC 140 to control the packet transfer from the internal buffer of the GEPHY controller 108 to the GEPHY Receiver Buffer 134 (and vice versa). The DIC TC 140 first writes the Receive Descriptor with an OWN bit 503 set to a first state. Each Receive Descriptor 136 comprises four words, each word having 32 bits. The first 31 bits of the first word are a "first reserved" field 501 which is reserved for future use.

The $32^{nd}$ bit of the first word in the Receive Descriptor 136 is the "OWN" bit 503. If the OWN bit 503 is in the first state, it indicates that the Receive Descriptor 136 is available for use by the DMA Controller 132. The DMA Controller can then use the Receive Descriptor 136 to indicate where to transfer a newly received Service Packet. Once the DMA Controller 132 reads the Receive Descriptor 136 and stores a Service Packet in the associated entry 138 in the GEPHY Receive Buffer Queue 309, the DMA controller 132 sets the OWN bit 503 of the Receive Descriptor 136 to the second state, which returns the Receive Descriptor 136 to the DIC TC 140 for reuse. Accordingly, when the OWN bit 503 is in the second state, the OWN bit 503 indicates that the DMA Controller 132 has finished using the Receive Descriptor 136. The DIC TC 140 can then reuse the Receive Descriptor 136. The DIC TC 140 will classify the packet in 136 according to some predefined classification criteria and move the Service Packet 136 from the GEPHY Receive Buffer Queue 309 to a virtual queue in the TLBEQ 315.

In one embodiment of the disclosed method and apparatus, an overflow condition occurs when there are no Receive Descriptors 136 for which the OWN bit 503 is in the first state. In one embodiment of the disclosed method and apparatus, the GEPHY controller 108 includes a Receive Buffer (not shown) that has a High Threshold. The High Threshold is the maximum number of received frames that can be stored in the controller's Receive Buffer before the generation of a flow control frame (e.g., a PAUSE frame) is triggered. The PAUSE frame is sent to ensure that no more Service Packets are sent until there are a sufficient room in the controller's Receive Buffer. Likewise, there is a Low Threshold (a point at which the PAUSE frame is released). In one embodiment, the High Threshold is a value that can be set by software depending upon the particular functions being performed by the nodes 102, 104 (i.e., how critical it is that an overflow condition does not occur and the tradeoff between an overflow condition occurring and the inefficiency that will result in generating a PAUSE frame unnecessarily).

The first 11 bits of the second word of the Receive Descriptor 136 comprise the "BufferSize" field 505 (see FIG. 5). The BufferSize field 505 indicates the amount of space available to store the received Service Packet in the entry 138 of the GEPHY Receive Buffer Queue 309 at the address indicated by a "BufferAddress" field 511 (i.e., the entry in the GEPHY Receive Buffer Queue 309 associated with that Receive Descriptor 136). The next 11 bits of the second word are a "second reserved" field 507. The last 10 bits of the second word of the Receive Descriptor 136 are a "third reserved" field 509.

The entire third word is the BufferAddress field 511. The BufferAddress field 511 indicates the address of the entry 138 in the GEPHY Receive Buffer Queue 309 associated with the Receive Descriptor 136. The BufferAddress field 511 is what associates the Receive Descriptor 136 with a particular entry 138 in the GEPHY Receive Buffer Queue 309.

Finally, the entire fourth and last word is the "NextDescriptorAddress" field 513. The NextDescriptorAddress field 513 indicates the address at which the next Receive Descriptor 136 starts. The use of the NextDescriptorAddress field 513 allows the Receive Descriptors 136 to be stored out of sequence and in non-contiguous locations within the GEPHY Receive Descriptor Queue 301. In one embodiment of the disclosed method and apparatus, the GEPHY Receive Buffer Queue 309 is a circular queue. Accordingly, the NextDescriptorAddress field 513 in the last Receive Descriptor points back to the first Receive Descriptor. In one embodiment, there are four entries in the GEPHY Receive Buffer Queue 309. Since there is a one to one relationship between the entries 138 in the GEPHY Receive Buffer Queue 309 and the Receive Descriptors 136 in the GEPHY Received Descriptor Queue 301, there are also four Receive Descriptors 136 in the GEPHY Receive Descriptor Queue 301 (see FIG. 4).

The BufferSize field 505 has 11 bits. Thus, the Service Packet can be up to 2048 bytes in length (i.e., 2 raised to the $11^{th}$ power). Note that in this application, each Service Packet requires only one entry 138 in the GEPHY Receive Buffer Queue 309. Accordingly, there is only one Receive Descriptor 136 associated with each Service Packet 138. When a Service Packet is received by the GEPHY Controller 108 and is stored into the GEPHY Receive Buffer Queue 309, the OWN bit 503 within the corresponding Receive Descriptor 136 is set to the second state.

As noted above, the DMA Controller 132 is controlled through the Receive Descriptors 136. That is, the DMA Controller 132 reads the OWN bit 503 and the BufferAddress field 511 from the Receive Descriptors 136. The DMA Controller 132 determines where to store each of the incoming Service Packets based on the OWN bit 503 and the BufferAddress field 511. If the OWN bit 503 is in the first state, then the Receive Descriptor 136 is available for use by the DMA Controller 132. If the own bit 503 is in the second state, the Receive Descriptor 136 is unavailable to the DMA Controller 132. The DMA controller 132 must wait for a Receive Descriptor 136 to become available again (i.e., for the OWN bit 503 to be in the first state). The Service Packet 138 is stored at the location indicated by the BufferAddress field 511 of that Receive Descriptor 136. Note that once one Receive Descriptor 136 is used by the DMA controller, the DMA controller will use the next Receive Descriptor 136 for the next packet (The GEPHY Receiver Descriptor Queue works in a circular way).

In addition to the DMA controller 132 reading the OWN bit 503, the DIC TC 140 reads the OWN bit 503 from each Receive Descriptor 136 to find those Receive Descriptors for which the OWN bit 503 is in the second state. When the DIC TC 140 finds a Receive Descriptor 136 with the OWN bit 503 set to the second state, the DIC TC 140 looks for an open entry in the TLBEQ 315 into which to store the first PDU of the Service Packet. In the case in which a PDU is the same size as the Service Packet, the first PDU will be the entire Service Packet. Accordingly, the entire Service Packet will be stored in one entry 319 in the TLBEQ 315. However, if the PDU is smaller than the Service Packet, then the DIC TC 140 will fragment the Service Packet. The first portion of the Service Packet having a size equal to the PDU will form the first PDU of the Service Packet. The first PDU of the Service Packet will be stored in the next available entry 319 in the TLBEQ 315.

The DIC TC 140 determines in which entry 319 of the TLBEQ 315 the first PDU will be stored by reading a "State Information" field stored in the Transmit Line Buffer Descriptor 305 in the shared memory 118. One such State Information field is maintained in the Transmit Line Buffer Descriptor 305 for each entry 319 (i.e., each PDU stored) in the TLBEQ 315. The Transmit Line Buffer Descriptor 305 has the following format:

TABLE 1

Transmit Line Buffer Descriptor Format

| Address (Offset from Base) | Bit Location | Description |
| --- | --- | --- |
| 0x00 | Bit 31-28 | SW Utility: If not used, this field is all 0s. |
|  | Bit 27-26 | Reserved. |
|  | Bit 25 | Block Write Mode Enable: set to 1 (used). |
|  | Bit 24 | Pointer Mode Enable: set to 0 (not used). |
|  | Bit 23-16 | Not used: Entry Size: in bytes This value is used to determine the size of each entry in the entry queue. The maximum value for this field is 64 bytes. |
|  | Bit 15-0 | Packet Data Unit Size: in bytes |
| 0x04 | Bit 31-0 | Number Entries in Entry Queue |
| 0x08 | Bit 31-0 | Entry Queue Base Address |
| 0x0c | Bit 31-0 | Entry Queue Size: in bytes |
| 0x10 | Bit 31-0 | Reserved. (Next Sequential Write Address: optionally used by the write process) |
| 0x14 | Bit 31-0 | Reserved. (Next Sequential Read Address: optionally used by the read process) |
| 0x18 | Bit 31-0 | Reserved. (Next Sequential Write Index: optionally used by the write process) |

TABLE 1-continued

Transmit Line Buffer Descriptor Format

| Address (Offset from Base) | Bit Location | Description |
|---|---|---|
| 0x1c | Bit 31-0 | Reserved. (Next Sequential Read Index: optionally used by the read process) |
| 0x20 | Bit 31-24 | Reserved. (Number Entries per Block: This defines the Block size when operating in Block Write Mode) |
|  | Bit 23-0 | Reserved. (Block Free Flags) |
| 0x24 | Bit 7-0 | State Entry 0: describes the state of the Queue Entry #0<br>b0: 0 = Write Process owns the entry; 1 = Read Process owns the entry;<br>other 7 bits are reserved. |
|  | Bit 23-8 | NextPDU pointer: Points to the index of the next PDU of the SPU.<br>If FFF, then this PDU is the last PDU of the SPU. |
|  | Bit 31-24 | Reserved |
| ... | ... | ... |
| 0x24 + (N − 1) * 4 | Bit 7-0 | State Entry N − 1: describes the state of the Queue Entry #N − 1<br>b0: 0 = Write Process owns the entry; 1 = Read Process owns the entry;<br>other 7 bits are reserved. |
|  | Bit 23-8 | NextPDU pointer: contains the index of the next PDU of the SPU.<br>If FFF, then this PDU is the last PDU of the SPU. |
|  | Bit 31-24 | Reserved |

The Transmit Line Buffer Descriptor 305 includes 0x24+4(N−1) words, where N is the number of entries 319 in the TLBEQ 315. Each word in the Transmit Line Buffer Descriptor 305 is 8 bits wide. The State Information field in the Transmit Line Buffer Descriptor 305 is stored in 4 such words starting at the offset 0x24. Accordingly, the State Information field of each entry 319 in the TLBEQ 315 is maintained by the four words stored at offset addresses 0x24+(N−1)*4, where N is the number of entries 319 in the TLBEQ 315. For the 4$^{th}$ entry in the TLBEQ 315, the offset (from the base address within the Transmit Line Buffer Descriptor 305) of the State Information field is 0x24+12. The first bit in the first word in the State Information field indicates the State Information field of the associated entry 319 (i.e., whether the entry is owned by the write process or the read process). The other 7 bits of the first word of the State Information field are reserved for future use.

The second and third word (i.e., bits 8 through 23) of the State Information field are a NextPDU pointer 327 (see FIG. 3). The NextPDU Pointer 327 provides the location of the next PDU that is part of the same Service Packet as the PDU to which the State Information field is associated. That is, each PDUs that was part of the same Service Packet is linked by the NextPDU Pointer 327 in the State Information field of the Transmit Line Buffer Descriptor 305.

Table 1 shows that one of the fields in the Transmit Line Buffer Descriptor 305 indicates the base address of the TLBEQ 315. Another field indicates the size of a PDU (note that in one embodiment of the disclosed method and apparatus, all PDUs are the same size). In accordance with one embodiment of the disclosed method and apparatus, each entry in the Tx Line Buffer Descriptor 305 is stored sequentially.

The DIC TC 140 reads the State Information fields associated with each entry 319 until it finds one for which the status indicates that the associated entry 319 is owned by the write process (i.e., the DIC TC 140 owns the entry 319). The DIC TC 140 then writes the first PDU of the Service Packet into that entry 319. The DIC TC 140 then hands the entry 319 to a MoCA Port Control TC 133. For each Service Packet copied into the TLBEQ 315, the DIC TC 140 generates an associated PD 321 (see FIG. 3). The PD 321 has the following format:

TABLE 2

Protocol Descriptor format:

| Address (offset from base) | Field Name | Bit Loc | Description |
|---|---|---|---|
| 0x00 | DATA_LENGTH | 31-16 | Number of bytes of the SPU. |
|  | CHANNEL_NUM | 15-4 | Destination ID. |
|  | BROADCAST_TYPE | 3-2 | Extended from Zip 1.2 usage as follows:<br>0 = Unicast<br>1 = Multicast<br>others = reserved |
|  | DATA_STATUS | 1 | Status of data<br>1 = Error<br>0 = No Error |
|  | SW_OWNERSHIP | 0 | SW Ownership semaphore:<br>1 = Owned by CCPU embedded software<br>0 = Owned by DIC TC |
| 0x04 | PD_ID | 31-16 | Used by the DIC or External Host to provide an identifying value for each Protocol Descriptor. |
|  | PKT_CLASSIFICATION | 15-12 | This contains the value associated with classification of the packet.<br>QoS level of the packet,:<br>b1000: Parameterized QoS<br>b0xxx: priority level, from the UserPriority field of the VLAN tag. |
|  |  | 11-0 | reserved |
| 0x08 | NextPD | 31-16 | Optionol: Points to the next PD for the AggregotionID |
|  | PDU0 pointer | 15-0 | Pointing to the first PDU (PDU0) of the SPU in the Entry Queue. Other PDUs of the same SPU are indicated by the NextPDU pointer in the State Entry of the Buffer Descriptor. |

The PD 321 contains an index (the "PDU0 pointer" 328 shown in FIG. 3) which points to the first PDU of the Service Packet associated with that PD 321. The other PDUs of the same Service Packet are linked together by a "NextPDU" pointer 327 within the State Information field of each entry 319 in the Transmit Line Buffer Descriptor 305 (See Table 1, Bit 8-23 at the offset 0x24). The NextPDU pointer 327 points to the entry holding the next PDU of the same Service Packet. In this way, all of the PDUs that come from the same Service Packet are strung together. The State Information field of the entry 319 holding the last PDU in the string has its NextPDU set to FFF.

The Protocol Descriptors 321 are stored in a Protocol Descriptor Queue 323 located in the MoCA CPU I/D Memory 112. In accordance with one embodiment of the disclosed method and apparatus, the Protocol Descriptor Queue 323 can hold thirty-two PDs. The Protocol Descriptor Queue 323 is periodically read by the MoCA CPU 114. The MoCA CPU 114 uses the Protocol Descriptors 321 to generate Reservation Requests over the MoCA network between the nodes 102, 104. When the reservation request is granted, the MoCA CPU 114 generates a MoCA descriptor for each MoCA Packet to be transmitted. At the scheduled transmit time, the MoCA Port Control TC 133 reads out one PDU at a time from the TLBEQ 315. Once the PDU is read out of the TLBEQ 315, the MoCA Port Control TC 133 hands ownership of the TLBEQ entry 319 from which the PDU was read back to the DIC TC 140 by resetting the SW_OWNERSHIP bit in the PD (see Table 2).

The MoCA CPU 114 checks the Protocol Descriptor Queue 323 to see how many PDs indicate that there are packets currently available to be sent over the MoCA network to the receiving node 104 (i.e., how many PDs have the SW_OWNERSHIP Bit set to a value of "1"). The MoCA CPU 114 groups as many as possible of the currently available PDs that share the same packet aggregation properties (i.e., destination node and priority) into a single MoCA Packet having a size that is as close as possible to the Maximum MoCA Packet size (8 k Bytes). The MoCA CPU 114 makes one MoCA Reservation Request for each MoCA Packet. Several MoCA Packets (each associated with one such reservation request) can be sent once the reservation requests are granted. When the reservation request is granted, the transmitting node 102 is provided an opportunity to communicate a MoCA Packet over the MoCA network to the receiving node 104.

In accordance with the embodiment in which the nodes 102, 104 communicate using MoCA, there are two MoCA Packet formats that are used. Which of the two is selected depends upon whether PDUs from more than one Service Packet will be aggregated in the MoCA Packet. In one embodiment of the disclosed method and apparatus, in order to aggregate PDUs from more than one Service Packet, both the receiving and transmitting nodes 102, 104 must be capable of handling aggregated packets. However, even in the case in which both the transmitting and receiving nodes 102, 104 are capable of handling aggregation, there may be other reasons why PDUs from more than one Service Packet are not aggregated in the MoCA Packet that is transmitted from the transmitting node 102 to the receiving node 104.

The first MoCA Packet format is used in the case in which PDUs from more than one Service Packet will not be aggregated. In this case, the PDUs of only one Service Packet are concatenated without the need for an Aggregation Header.

Accordingly, the format is:

TABLE 3

| MoCA Header | PDU0 | PDU1 |
|---|---|---|
| | <---------- original asynch packet ----------> | |

In the case show in Table 3, the original Service Packet had a length that required the Service Packet to be divided into two PDUs, but both PDUs are sent over the MoCA network in the same MoCA Packet. It should be noted that for this case, the only reason to divide the received Service Packet into PDUs is for consistency with the case in which packets from different Service Packets might be aggregated. That is, the Service Packet is divided into PDUs since it is not known when the Service Packet is being processed whether the content of the Service Packet will be aggregated with PDUs from another Service Packet.

In accordance with the second MoCA Packet format an Aggregation Header describes the Service Packets contained in the MoCA Packet. One MoCA Packet may contain PDUs from more than one Service Packet.

TABLE 4

| MoCA Header | Aggregation Header | SPU0 | SPU1 | ... | SPU (N − 1) |
|---|---|---|---|---|---|

As shown in Table 4, the second MoCA Packet format includes a MoCA Header. Table 5 indicates the format for the MoCA Header.

TABLE 5

MoCA Header Format

| SubField | Length | Usage |
|---|---|---|
| Transmit Clock | 32 bits | System time |
| Packet type | 4 bits | Indicates the type of the MAC packet |
| Reserved | 4 bits | |
| Version | 8 bits | MAC version |
| Source node ID | 16 bits | |
| Destination node ID | 16 bits | |
| Packet Length | 16 bits | Length of this MAC packet in bytes, inclusive of the packet header, payload and CRC at the end |
| Reserved | 28 bits | Reserved |
| Aggregation-Fragmentation Control | 4 bits | Bit 3: Aggregation Header is inserted (1) or not (0) Bit 2: Sequence Number is included (1) or not (0) in the Aggregation Header; Bit 1: Aggregation Header Checksum enabled (1) or not (0) Bit 0: Original FCS of each SPU is included (1) or not (0) |
| Header Check Sequence | 16 bits | Header CRC |

The MoCA Header has 10 subfields. The first subfield in the MoCA Header shown in Table 5 is a 32 bit Transmit Clock subfield that provides system time. The second subfield in the Header indicates the packet type (i.e., whether the first or second type). The third subfield in the Header is reserved for future use. The fourth subfield indicates the version of the MoCA MAC layer that is being used. The fifth subfield indicates the source node from which the Service Packets in this MoCA Packet originated. It should be noted that in one embodiment, there may be Service Packets that have originated from more than one source node. The sixth subfield is the destination node to which each of the Service Packets in the MoCA Packet are being sent. It should be noted that all of the Service Packets in the MoCA Packet have the same destination node. However, it should also be noted that if all of the Service Packets in the MoCA Packet are to be broadcast, the destination could be all of the other nodes in the network.

As noted in Table 5, the seventh subfield indicates the length of the MoCA Packet, including the header and all other content and overhead. The eighth subfield comprises 24 reserved bits. The ninth subfield is called the Aggregation-fragmentation Control subfield and includes four bits. The first bit of the Aggregation-fragmentation Control subfield indicates whether an Aggregation Header is present in this MoCA Packet. The second bit indicates whether a sequence number is included. The sequence number is used to indicate which packet from among several packets of a sequence this particular MoCA Packet is relative to the other packets of that sequence. The third bit of the Aggregation-fragmentation Control subfield indicates whether an Aggregation Header Checksum is being used. The fourth and last bit of the Aggregation-fragmentation Control subfield indicates whether a frame check sequence is being used in this MoCA Packet. The tenth and last subfield in the MoCA Header is a Header Check Sequence used for forward error correction.

The second field of the MoCA Packet is the Aggregation Header. Generally, the Aggregation Header indicates which Service Packets are to follow in this MoCA Packet. Table 6 indicates the format for the Aggregation Header.

the number of Service Packets aggregated in the MoCA Packet. Accordingly, if there were eight Service Packets being aggregated in the MoCA Packet, then the Aggregation Header would have a length of 16*(3+8)=176 bits.

The first subfield of the Aggregation Header is a Sequence Number. The Sequence Number is used to indicate the relative place this MoCA Packet will take within a sequence of MoCA Packets that are to be sent. The second subfield of the Aggregation Header is a Service Packet Count that represents the number of Service Packets that are to be aggregated in this MoCA Packet. Each of the N subfields that follow is a Service Packet Size that indicates the size (in bytes) of a respective one of the Service Packets that is being aggregated. The last subfield is checksum for the entire Aggregation Header.

In accordance with one embodiment of the disclosed method and apparatus, during the node admission phase, and for link layer messaging, only type I format is used.

The MoCA CPU 114 selects which Service Packets (i.e., which PDUs) to aggregate in each MoCA Packet by reading the PDs from the Protocol Descriptor Queue 323. Each PD in the Protocol Descriptor Queue 323 is associated with an Aggregation ID 325. In one embodiment of the disclosed method and apparatus, the Aggregation ID 325 is formed by concatenating the value used to indicate the destination node (i.e., the node to which the Service Packet associated with the PD is to be sent) with the value used to indicate the priority of the Service Packet. Priority is a concept that is well known in MoCA networks that employ Prioritized and/or Parameterized Quality of Service (PQoS). In embodiments in which there is no priority associated with the Service Packet, the destination alone will determine the Aggregation ID. It will be understood by those skilled in the art that the Aggregation ID can be formed in other ways for other applications. That is, other characteristics of the Service Packet associated with the PD can be used to determine which Service Packets or PDUs of each Service Packet to aggregate together in one MoCA Packet.

The MoCA CPU 114 will check how many PDs are ready to be put on the MoCA network, whether the PDUs associated

TABLE 6

Aggregation Header Format

| Subfield | Length | Usage |
|---|---|---|
| Sequence Number | 16 bits | If the Aggregation-Fragmentation Control indicates that Sequence Number is included, this field contains the Sequence Number. Otherwise this field is Reserved. |
| Service Packet Count | 16 bits | Number of Service Packets in this MoCA Packet. |
| Service Packet 0 size | 16 bits | Size (in Bytes) of the first Service Packet |
| Service Packet 1 size | 16 bits | Size (in Bytes) of the second Service Packet |
| ... | ... | ... |
| Service Packet N − 2 size | 16 bits | Size (in Bytes) of the N − 2 Service Packet |
| Service Packet N − 1 size | 16 bits | Size (in Bytes) of the N − 1 Service Packet |
| CheckSum | 16 bits | If enabled (as defined in the Aggregation-Fragmentation Control), this field is checksum of the Aggregation Header. If disabled, this field contains all zeros. This check is for software use only. |

The Aggregation Header has a variable length. The length depends upon the number of Service Packets that are to be aggregated. In one embodiment of the disclosed method and apparatus, each subfield has a length of 16 bits. The length in bits of the Aggregation Header is 16 times the sum of 3 with with those PDs will all fit in one MoCA Packet, and whether each of the PDs have the same Aggregation ID. All of the PDs that are ready, that will fit in one MoCA Packet and that have the same Aggregation ID, are aggregated into one MoCA Packet. The aim is to make the MoCA Packet as large as possible to increase the efficiency of the MoCA network. However, it will be understood by those skilled in the art, that there may well be other benefits of the present method and apparatus beyond simply increasing the efficiency of the MoCA network.

In accordance with one embodiment, when the node 102 is given a Reservation Request opportunity within a MoCA cycle, a Reservation Request is made for the group of packets that have the same Aggregation ID, but only when there are enough PDUs so that the aggregated packet length is larger than a predetermined number of Bytes (e.g. 4 kBytes). Otherwise the current reservation request is passed and no MoCA Packets will be sent until the next Reservation Request opportunity comes. In accordance with one embodiment, a timer will time out after a predetermined time and the transmitter will make a Reservation request for the PDUs available to transmit after that timeout.

The order in which Service Packets that have the same Aggregation ID arrive is defined by the order in which PDs associated with the Service Packets are written into the Protocol Description Queue 323. The PDs with the same Aggregation ID are linked together by a Linked PD List. This linkage can be created by one of at least two different methods.

The first method is to generate a Linked PD List is for the DIC TC 140 to create one Linked PD List for each unique Aggregation ID when it creates the PD for each newly received Service Packet. The Protocol Descriptor Queue 323 of FIG. 3 is an illustration of one example of how a Linked PD List can be handled. In accordance with this embodiment, the DIC TC 140 initially creates the Linked PD List by storing the Aggregation ID 325 and a NextPD pointer 327 in the Protocol Descriptor Queue 323. Initially, the NextPD pointer 327 is left with a default value, indicating that no subsequent Service Packet has been received with the same Aggregation ID. In accordance with this embodiment of the disclosed method and apparatus, the DIC TC 140 keeps a "Read" pointer and a "PreviousPD" Pointer for each Linked PD List.

The Read Pointer points to the head of the Linked PD List. Accordingly, each Linked PD List will have one Read Pointer associated with that List. The Read Pointer allows the DIC TC 140 to find the head of the list when it is time for the MoCA CPU 114 to form the MoCA Packets. In this way, by conveying the Read Pointer to the MoCA CPU 114, the MoCA CPU 114 can read out all the PDs with the same Aggregation ID in their relative time order, to make reservation requests. The NextPD Pointer connects each entry in the Linked PD List with the next entry.

Accordingly, when the first Service Packet is received, in addition to loading the Aggregation ID value into the Aggregation ID 325, the DIC TC 140 will save the location of this first PD in both the Read pointer and the PreviousPD Pointer. When a new Service Packet is received with the same Aggregation ID, the PD for that Service Packet will include the Aggregation ID 325. The NextPD Pointer 327 will initially have the default value indicating that it is associated with the most recently received Service Packet. However, the DIC TC 140 will use the PreviousPD Pointer to identify the location of the last PD of the Linked PD List (in this case, the first PD in the Linked PD List). The DIC TC 140 will then update the NextPD Pointer 327 of the PD indicated by the PreviousPD Pointer with the value of the PD associated with this most recently received Service Packet. In addition, the DIC TC 140 will update the PreviousPD Pointer held by the DIC TC 140 with the value of the new PD so that when the next Service Packet arrives, the DIC TC 140 will be able to find the end of the Linked PD List.

In this way, each time a new Service Packet is received and a PD is generated for that Service Packet, the Linked PD List will be updated to include this new PD. In this method, the DIC TC 140 may write the new PD anywhere that is free in the Protocol Description Queue 323, since the relative order in which the Service Packets were received and the location of each associated PD is maintained by the Linked PD List.

The second method is to generate a Linked PD List is for the DIC TC 140 to add new PDs to the Protocol Description Queue 323 sequentially from the first entry (entry number 0) to the last entry (entry M−1). In this embodiment, the Protocol Description Queue 323 is circular. That is, the last entry (entry M−1) in the Protocol Description Queue 323 points back to the first entry (entry 0). Accordingly, the relative order in which each Service Packet associated with each PD was received is maintained in the Protocol Description Queue 323. The MoCA CPU 114 will read out these PDs from the Protocol Description Queue 323 from time to time within a MoCA MAP cycle. The MoCA CPU 114 will sort them into the appropriate Linked PD List and store them to the MoCA CPU I/D Memory 112 to be used to generate reservation requests. Once a PD has been read by the MoCA CPU 114, that entry in the Protocol Description Queue 323 will be released back to the DIC TC 140 so that the next PD can be stored.

It should be noted that a problem can arise in the case in which the entire Transmit Line Buffer Entry Queue 315 is available to all PDUs. That problem would occur if a large block of Service Packets, each of which has the lowest priority, are received by the GEPHY Controller 108. Each of the received Service Packets is fragmented as necessary and the PDUs that are formed from the Service Packets are stored in the Transmit Line Buffer Entry Queue 315 as noted above. These low priority PDUs can occupy the whole Transmit Line Buffer Entry Queue 315. Accordingly, higher priority Service Packets will not be able to be received from the GEPHY Receive Buffer Queue 309 until some of the low priority PDUs are cleared out of the Transmit Line Buffer entry Queue 315. It would be undesirable to allow such low priority Service Packets to prevent higher priority Service Packets from being received. Furthermore, a large number of these low priority Service Packets could get "trapped" in the Transmit Line Buffer Entry Queue 315 for a very long time if a steady stream of higher priority Service Packets come into the MoCA nodes at a rate equal to the rate at which MoCA Packets can be sent over the MoCA network (i.e., the higher priority packets on other nodes are using most of the network bandwidth, and the higher priority packets in the node under consideration are being blocked by the lower priority packets in the same node). The only time the Transmit Line Buffer Entry Queue 315 would start to clear out the lower priority Service Packets is when the rate at which the incoming new higher priority Service Packets is lower then the rate at which MoCA Packets are being generated out from the Transmit Line Buffer Entry Queue 315 and sent over the MoCA network.

To avoid this, the concept of Virtual Queues is used. Each Aggregation ID 325 is associated with a Virtual Queue 329 (see FIG. 3). Each Virtual Queue 329 has a maximum size that is configurable. Each Virtual Queue 329 also has a configurable property that defines what to do when the Virtual Queue 329 is full. The property can be set to either trigger a MII/GMII flow control (PAUSE frame) so that no packets will come in or allow the packets to come in but drop them or let them overwrite the existing packets as long as the Virtual Queue 329 is full.

Since each Service Packet must pass through one of the Virtual Queues 329, the size of the Virtual Queues 329 will determine the maximum achievable transmit throughput for that Virtual Queue 329 (i.e., the throughput for those Service Packets that have an Aggregation ID that is associated with that Virtual Queue 329). Therefore, in order to optimize the throughput, it is desired to make each Virtual Queue as large as possible. On the other hand, low priority packets that are associated with low priority Aggregation IDs may remain for a long time in the Virtual Queues 329. This reduces the efficiency of the shared memory in which the Virtual Queues 329 are stored. Accordingly, it is desired not to over-allocate memory to the low priority Virtual Queues. One way to maximize the efficiency of the Transmit Line Buffer Entry Queue 315 and achieve the highest possible throughput for low priority packets when there are relatively few high priority packets, without stalling the incoming high priority packets, is to choose an optimal value for the maximum size of each Virtual Queue 329. The optimal value is a function of the traffic profile of both the node itself and the network. In one embodiment of the disclosed method and apparatus, as the traffic profile changes, the Virtual Queues 329 may be dynamically resized.

In accordance with one embodiment of the disclosed method and apparatus, dynamic resizing of the virtual queues is performed on the fly (essentially in real time) by application software during normal operation. In one such embodiment, the application software is in the external network processor 124 (see FIG. 2). In another embodiment, the application software is in the MoCA CPU 114. Dynamic resizing may be needed to rebalance the relative maximum throughput limits of different Virtual Queues 329 to add or remove a flow (i.e., stream of Service Packets). In one such embodiment, the application driver directly modifies the size of each Virtual Queue 329. The size of each Virtual Queue 329 is stored in a memory location in the shared memory 118. Alternatively, the size of each Virtual Queue 329 is stored in the MoCA CPU I/D Memory 112. In either case, the size is accessible to the external network processor 124, the DIC TC 140, and the MoCA CPU 114. When a Virtual Queue 329 is reduced in size, the number of PDUs currently in the Virtual Queue 329 may be larger than the new size of the Virtual Queue 329 will accommodate. However, in accordance with one embodiment of the disclosed method and apparatus no PDUs will be dropped. In accordance with one embodiment, the new size of a Virtual Queue 329 takes effect for the newly arriving packets only. New packets that arrive after the change in the size of the Virtual Queue 329 will be either blocked by the GMII/MII (Xoff state) or dropped, depending on the configuration set for the Virtual Queue 329.

Each Aggregation ID identifies packets that can be aggregated into one MoCA Packet. In one embodiment of the disclosed method and apparatus, the Aggregation ID is associated with the group of all packets to be sent to the same destination with the same priority level. To support N destination nodes and P priority levels requires N times P Virtual Queues 329. For example, if N=15 and P=4, 60 Virtual Queues 329 are required. In the case in which there is limited shared memory, each Line Buffer will be very small. Relatively small Virtual Queues will limit the extent to which packet aggregation can be done. That is because packets to be aggregated into a single MoCA Packet need to reside in the same Virtual Queue 329. To achieve good packet aggregation, each Virtual Queue needs to be big enough to hold a sufficient number of PDUs. In one embodiment of the disclosed method and apparatus, knowledge of the particular application that is being implemented can be used to help define the size of each Virtual Queue and the definition of each Aggregation ID. In one example, only one priority level is considered (aggregating all of the packets directed to the same destination in one MoCA Packet regardless of their priority). In another example, the number of destination nodes is restricted. Those of ordinary skill in the art will be able to identify several other such ways in which to make efficient use of the Virtual Queues 329.

In accordance with one embodiment of the disclosed method and apparatus, the sum of the sizes of all of the Virtual Queues 329 is equal to the total size of the Transmit Line Buffer Entry Queue 315. In an Alternative embodiment of the disclosed method and apparatus, the sum of the sizes of all of the Virtual Queues 329 is larger than total size of the Transmit Line Buffer Entry Queue 315. This accommodates the dynamic nature of the traffic (i.e., the fact that neither the rate of the traffic nor the number of Service Packets of each priority is constant). In accordance with one embodiment of the disclosed method and apparatus, any one of the Virtual Queues 329 can be programmed to trigger the flow control when it is full. In accordance with another embodiment, any subsets of the Virtual Queues 329 can be programmed to trigger the flow control when some of them, or all of them, are full. Alternatively, MII/GMII flow control is triggered when the Transmit Line Buffer Entry Queue 315 is full.

In accordance with one alternative embodiment of the disclosed method and apparatus, the external Ethernet driver buffers Service Packets before they are sent over the Ethernet to the node 102. The Service Packets are directly shaped into groups of packets that can be aggregated and placed in time sequence. The packets are then received by the node 102 in clusters that can be directly aggregated into a MoCA Packet. Each cluster may contain packets for the same destination and same priority. Alternatively, the packets are clustered using other aggregation criteria. A cluster may contain just one packet (no aggregation) or several packets. In accordance with this embodiment of the disclosed method and apparatus, there is just one transmit queue for all of the MoCA Packets to be transmitted. The circular Transmit Line Buffer Entry Queue 315 works in a sequential way. The MoCA CPU 114 makes reservation requests for one or several clusters of packets available in the Transmit Line Buffer Entry Queue 315. The efficiency of the aggregation mechanism is a function of the traffic shaping in the external host.

Receive Path

Turning now to the method and apparatus used for receiving aggregated packets from another node 104, the process begins with a MoCA Packet being received by the node 102 over the MoCA network. As was the case for the above description of the transmit path, the protocol used to implement the network between the nodes 102, 104 can be any protocol that will allow packets to be communicated between the nodes 102, 104. However, for the sake of illustrating a particular embodiment, a MoCA network and protocol are described herein.

MoCA Packets received by the node 102 from the node 104 are first received by the MoCA Port Control TC 133. The MoCA Port Control TC 133 programs a DMA to transfer the packet into one or more entries of the Receive Line Buffer Entry Queue 313 located in the shared memory 118 (See FIGS. 2 and 3). In one embodiment of the disclosed method and apparatus, each entry of the Receive Line Buffer Entry Queue 313 has sufficient packet data space to hold at least one maximum MoCA Packet and the Queue 313 contains a configurable number of entries.

The MoCA Port Control TC 133 programs the DMA by loading information into the Receive Line Buffer Descriptor

307. The Receive Line Buffer Descriptor 307 includes an owner flag that indicates whether an associated entry in the Receive Line Buffer Entry Queue 313 is available to accept a newly received MoCA Packet. These entries are then handed over to the DIC TC 140 within the GEPHY Controller 108 by changing the state of the owner flag.

The DIC TC 140 first looks at the MoCA Packet Header and the Aggregation Header. The DIC TC 140 also looks at the OWN bit within the GEPHY Transmit Descriptors in the GEPHY Transmit Descriptor Queue 303. The OWN bit indicates if the next GEPHY Transmit Buffer Entry within the GEPHY Transmit Buffer Queue 311 are available to accept the Service Packets. The DIC TC 140 loads one available GEPHY Transmit Descriptor for each received Service Packet (in the MoCA packet) with information that describes the Service Packet. The DIC TC 140 determines how many Service Packets have been received by reading the Aggregation Header received within the MoCA Packet. In accordance with one embodiment of the disclosed method and apparatus, the GEPHY Transmit Descriptor Queue 303 has sufficient space to hold two GEPHY Transmit Descriptors. Accordingly, the GEPHY Transmit Buffer Queue 311 has sufficient space to hold two outgoing Service Packets. In accordance with another embodiment of the disclosed method and apparatus, the GEPHY Transmit Descriptor Queue 303 holds a configurable number of GEPHY Transmit Descriptors.

Although the Receive Line Buffer Entry Queue 313 is organized in units of PDUs, each GEPHY Transmit Descriptor describes one complete Service Packet. The GEPHY Transmit Descriptor Queue works in a circular way, and is set up by the DIC TC 140. The GEPHY Transmit Descriptor is then handed over to the GEPHY Controller's DMA 132 by switching the OWN bit of the Transmit Descriptor to the GEPHY DMA 132. The DMA 132 will transfer a Service Packet (an Ethernet packet) to the GEPHY Controller 108, which will then send out an Ethernet Packet through the GMII/MII as soon as possible. After sending the Ethernet Packet, the GEPHY Transmit Descriptor is handed over back to DIC TC 140 by resetting the OWN bit, and the DIC TC 140 will process the Transmit Descriptor status, and reuse the descriptor. The DIC TC 140 can define and process the Transmit Descriptor either on an individual basis or on a group basis. During the process of transferring MoCA packets from the Rx Receive Buffer Entry Queue to the GEPHY Transmit Buffer Queue, the DIC TC 140 can perform filtering on these packets (including dropping some of the Service Packets) using predefined criteria that are application dependent.

In one embodiment of the disclosed method and apparatus, two GEPHY Transmit Descriptors are used, each describing a Service Packet in the Receive Line Buffer Entry Queue 313 and each of which is to be transferred over the Ethernet network. The GEPHY Transmit Descriptor has the same format as the Receive Descriptor.

In one embodiment of the disclosed method and apparatus, the Receive Line Buffer Entry Queue is able to hold more than one MoCA Packet. The minimum size is a function of the reaction and processing speed of the DIC TC 140 when a MoCA Packet is received and handed over to the DIC TC 140.

In one embodiment of the disclosed method and apparatus, the GMII/MII speed is configured to be well above the MoCA network speed in order to achieve the best throughput over the MoCA network. For the cases where the GMII/MII speed is close to or below the MoCA network speed, the Receive Line Buffer Entry Queue 319 needs to be configured large enough to absorb bursts of traffic coming to the node 102 over the MoCA network. In one embodiment, the exact size of the Receive Line Buffer Entry Queue 319 is a function of the maximum bit-loading used by the receiving node 102. In one embodiment, the receiving node may limit the bit-loading of the packets that it will be receiving so that the transmitting node will not send data to the receiving node faster than desired. In one embodiment, the bitloading limit is close to the speed that packets are received over the external network from the external network processor 124.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A communication control system, the system comprising:
   a) a memory;
   b) a physical layer controller coupled to the memory, the physical layer controller capable of executing instructions, the instructions allowing the controller to:
   i) generate at least one Receive Descriptor;
   ii) receive service packets from a first network;
   iii) store the service packets in the memory based on the content of the Receive Descriptor;
   iv) define Packet Data Units, all of the Packet Data Units being the same length;
   v) generate Protocol Descriptors and associate each such Protocol Descriptor with one or more Packet Data Units; and vi) store each Protocol Descriptor in an entry in the memory; and
   c) a Network Central Processing Unit (CPU) capable of executing instructions, the instructions allowing the Network CPU to:
   i) read the Protocol Descriptors; and
   ii) if there are more than a minimum number of Protocol Descriptors stored in the memory, then generating a reservation request on a second network;
   wherein the service packets are received in accordance with a first protocol and the Packet Data Units are transmitted in accordance with a second protocol;
   wherein the first network is an Ethernet network and the second network is a MoCA network.

2. The communication control system of claim 1, wherein the controller includes a direct memory access (DMA) controller and the DMA controller stores the service packets in the memory based on the content of the Receive Descriptor.

3. The communication control system of claim 1, wherein the service packet is an Ethernet packet.

4. The communication control system of claim 1, wherein the size of the received service packets differs from the size of the Packet Data Units.

5. The communication control system of claim 4, wherein each Packet Data Unit having content that originated in the same service packet will be associated with the same Protocol Descriptor.

6. The communication control system of claim 4, wherein defining Packet Data Units includes selecting a value for a controllable parameter that determines the size of the Packet Data Units.

7. The communication control system of claim 6, wherein the value for the controllable parameter is selected automatically.

8. The communication control system of claim 6, wherein the value for the controllable parameter is selected manually.

9. The communication control system of claim 1, wherein the received service packets are identical in size to the Packet Data Units.

10. The communication control system of claim 1, wherein the physical layer controller is a Gigabyte Ethernet Physical layer Controller (GEPHY).

11. The communication control system of claim 1, wherein the memory is divided into a receive buffer, a receive line buffer, a transmit buffer and a transmit line buffer.

12. The communication control system of claim 11, wherein the receive buffer is divided into a receive buffer queue and a receive descriptor queue.

13. The communication control system of claim 12, wherein the receive buffer queue receives the service packet from the physical layer controller.

14. The communication control system of claim 13, wherein the received buffer queue is defined and controlled by the receive descriptor queue.

15. The communication control system of claim 11, wherein the receive line buffer is divided into a receive line buffer descriptor and a receive line buffer entry queue.

16. The communication control system of claim 15, further including a port control transfer controller (TC) and a bus, wherein the port control TC is coupled to the network CPU and the memory over the bus.

17. The communication control system of claim 11, wherein packets received from the second network are stored in the receive line buffer entry queue and wherein the receive line buffer descriptor includes an owner flag that indicates whether an associated entry in the receive line buffer entry queue is available to accept a newly received packet from the second network.

18. The communication control system of claim 11, wherein the transmit buffer is divided into a transmit descriptor queue and a transmit buffer queue.

19. The communication control system of claim 18, wherein the physical layer controller loads the transmit descriptor queue for each received service packet with information that describes the service packet.

20. The communication control system of claim 11, wherein the transmit line buffer is divided into a transmit line buffer entry queue and a transmit line buffer descriptor.

* * * * *